2,889,998

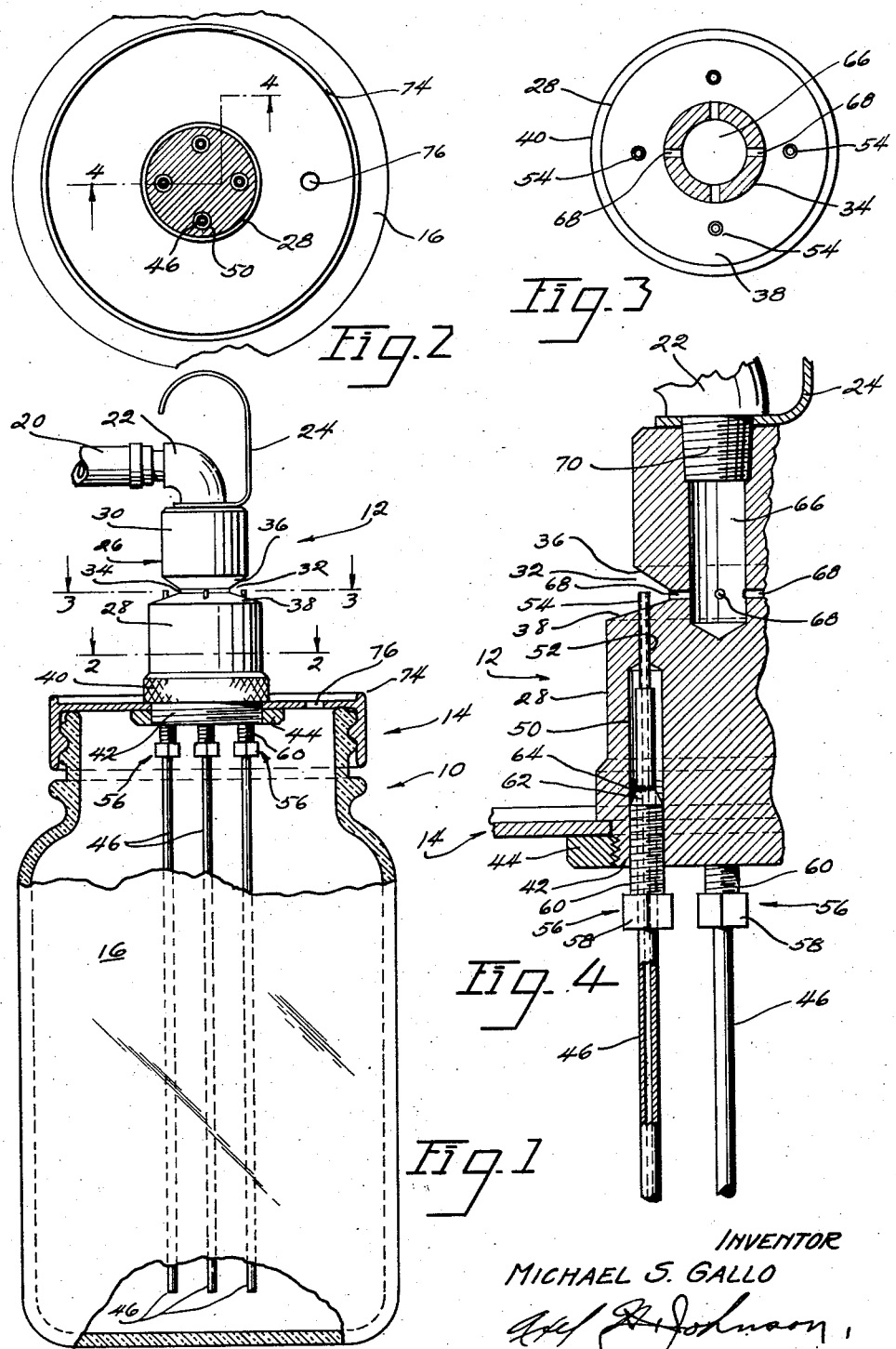

SYPHON SPRAYER

Michael S. Gallo, Racine, Wis.

Application September 6, 1955, Serial No. 532,689

4 Claims. (Cl. 239—341)

This invention relates to a sprayer for insecticides or the like, or for any spraying operation usually performed indoors, such as destroying flies and mosquitoes in stables. This invention relates especially to a syphon-type of sprayer.

Spray devices, generally, have one common fault and that is that they clog easily and require frequent disassembling for cleaning. The most difficult and annoying cleaning operation is that concerning the small passages in the various tubes and nozzles through which the insecticides pass. There seems to be no real solution to the clogging so it is desirable to design the sprayer so that it can be quickly disassembled and easily cleaned.

An object of this invention is to provide a sprayer that can be quickly disassembled for cleaning.

Another object is to provide a sprayer which is simple in design so that the passages through the various elements are straight so that a wire can be used for cleaning.

Another object is to provide elements that can be easily and quickly removed for cleaning.

Another object is to provide a sprayer having syphon tubes that can be adjusted so that the proper spraying action is obtained.

Another object is to provide a sprayer that will spray in four directions 90 degrees apart resulting in a spray cloud comprising a substantially complete ring.

Another object is to provide a sprayer having independent spray tubes to assure continuous operation even though one of the tubes may have become clogged.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but include all such variations and modifications as fall within the spirit of the invention.

Referring to the drawing:

Fig. 1 is a side view of the sprayer embracing the invention and having parts broken away to show details.

Fig. 2 is a plan view and showing a section taken at 2—2 of Fig. 1.

Fig. 3 is an enlarged sectional view taken at 3—3 of Fig. 1.

Fig. 4 is an enlarged sectional view taken at 4—4 of Fig. 2.

Referring to Fig. 1 of the drawing: The sprayer 10 comprises a spray head 12, a cover 14, and a conventional screw-top glass jar 16 threadedly engaged to the cover 14. A source of air under pressure is supplied by a hose 20 and elbow connection 22. A hook-shaped member 24 provides a convenient means of suspending the sprayer in a farm building or other location by means of a pipe or cable.

Head 12 comprises a cylindrical member 26 which can be turned in a screw machine or similar method of manufacture. Member 26 comprises a lower portion and an upper portion which are mutually co-axial. A recess 32 is provided intermediate portions 28 and 30 as shown in Figs. 1 and 4. Recess 32 comprises a cylindrical bottom portion 34 and axially-diverging cone-like faces 36 and 38. The lower end of portion 28 is provided with an enlarged diameter 40 which is knurled so that it can be grasped firmly when assembly or disassembling the sprayer. A threaded portion 42 is provided adjoining enlarged diameter 40, and passes through a suitable hole in cover 14. A hexagon nut 44 is threadedly engaged on portion 42 and when turned against cover 14 secures head 12 integrally in place on the cover.

In this instance, spray head 12 is provided with four syphon tubes 46 having fine bores, and spaced at 90 degrees apart. Tubes 46 have their axes parallel to the axis of head 12 as shown in Figs. 1 and 4. Syphon tubes 46 comprise suitable lengths of tubing of brass or suitable material for the purpose. They should terminate at a substantial distance from the bottom of the jar 16 so that foreign particles or undissolved spray material lumps will not readily find their way into the bores of tubes 46.

Tubes 46 are fitted into holes 50 drilled from the bottom of head 12 a suitable distance as shown in Fig. 4. Holes 52 are co-axial with holes 50, and of a reduced diameter. Holes 52 extend from the ends of holes 50 and pass through face 38. The upper ends 54 of tubes 46 are reduced in diameter as shown in Fig. 4 so as to pass freely through holes 52. The purpose of the reduced diameter is to permit a more thorough breaking down of the insecticide into a fine spray and avoid the formation of large droplets, the latter causing the accumulation of the insecticide on the cover 14.

Collets 56 provide means of securing tubes 46 in head 12, and have a hexagon or square head 58 so that a wrench can be used when assembling or axially adjusting the tubes 46. An elongated threaded shank 60 of collet 56 is threaded in each instance into holes 50 so that axial adjustment can be made. A suitable axial hole is drilled through collet 56 to accommodate tube 46, and the upper end of shank 60 is turned to a conical point 62. The junctures 64 of tube 46 and collets 56 are secured integrally by soldering or if preferred, by swaging.

A hole 66 is drilled from the top of head 12 to a point indicated in Fig. 4, and co-axial with the axis of head 12. Four holes 68 are drilled radially in bottom portion 34 of recess 32, one hole 68 having its axis lying in a plane common with the axis of one of tubes 46 as shown in Figs. 3 and 4. Holes 68 are approximately .030 inch diameter in this instance.

Connection 22 is secured to upper portion 30 of head 12 by a nipple 70 threaded into hole 66 as shown in Figs. 1 and 4, or by similar well known means. Hook 24 is placed intermediate the upper end of portion 30 and elbow connection 22, and permits the sprayer to be suspended on any convenient pipe or hook. Hose 20 is extended to any source of air supply providing a suitable pressure.

Tubes 46 are adjusted axially so that the proper mixture of air and insecticide is obtained to create a fine mist. The most satisfactory results are obtained when the axes of holes 68 and the upper surface of ends 54 lie in a common plane. Slight adjustments can be made in either direction by turning collets 56 in the desired direction. It is clear that in order to unclog tubes 46 or holes 68 it is merely necessary to insert a straight wire, as there are no bends in the passages.

Cover 14 is provided with a raised bead 74 to confine insecticide that has not been atomized and has accumulated on the cover. A hole 76 in cover 14 permits the accumulation to pass back into the jar 16.

The above being a complete description of an illustrative embodiment of the invention, what is claimed as new and desired to be secured by Letters Patent of the United States is:

1. A sprayer, having a cover for threaded engagement on a jar, a spray head having a central longitudinal axis and positioned on said cover, said head having an annular groove intermediately its ends provided with a cylindrical bottom and outwardly-diverging faces extending from said bottom, said head provided with a passage extending axially from the top of said head to a point beyond said bottom, air supply means connected to said passage, said head having a plurality of radially-extending holes connecting said bottom with said passage and positioned 90 degrees apart, a plurality of syphon tubes spaced about the axis of said head, one of each of said tubes having its axis lying substantially in a plane common to the axis of one of said radially-extending holes and protruding into said groove intermediate said faces, a collet secured integrally to each of said tubes and threadedly engaged in said head for axial adjustment of said tubes relative to the axes of said radially-extending holes.

2. A sprayer, comprising a cover for engagement on a jar, in combination, a spray head having a central longitudinal axis, being positioned on said cover and secured integrally therewith, said head having an annular groove intermediately of its ends provided with a bottom and outwardly-diverging faces extending from said bottom, said head provided with a longitudinal passageway extending from the top of said head to a point adjacent said bottom, air supply means connected with said longitudinal passageway, said head having a plurality of holes spaced about said bottom and defining passageways between said bottom and said longitudinal passageway, a plurality of syphon tubes spaced about the axis of said head, one of each of said tubes having its axis intersecting the axis of one of said holes and protruding into said groove intermediate said faces, a collet secured co-axially to each of said tubes and threadedly engaged in said head for axial adjustment of said tubes relative to the axes of said radially-extending holes.

3. A sprayer, in combination, comprising a cover, a spray head having a central axis and positioned on said cover, said head having an annular groove provided with outwardly-diverging faces and a longitudinal passage, air supply means connected to said longitudinal passage, said head having a plurality of radially extending holes of a diameter substantially equal to the width of the bottom of said groove connecting said groove with said longitudinal passage and normal to said axis, a plurality of syphon tubes spaced about the axis of said head, one of each of said tubes having its axis substantially intersecting the axis of one of said holes and protruding into said groove intermediate said faces, and means to effect axial adjustment of said tubes relative to the axes of said radially-extending holes.

4. A spray head having a central longitudinal axis and an annular groove provided with opposed outwardly-diverging cone-shaped faces and a bottom substantially at the apex of the angle formed by said faces, said head provided with a longitudinal air passage and a hole extending from said bottom to said passage, a syphon tube spaced from the axis of said head and having the axis thereof lying substantially in a plane common to that of said hole, said tube terminating intermediate said faces.

References Cited in the file of this patent

UNITED STATES PATENTS

| | | |
|---|---|---|
| 771,460 | Clarkson | Oct. 4, 1904 |
| 1,437,201 | Schumann | Nov. 28, 1922 |
| 1,974,350 | Turnbull | Sept. 18, 1934 |
| 2,368,536 | Gersmehl | June 30, 1945 |
| 2,782,072 | Stock et al. | Feb. 19, 1957 |

FOREIGN PATENTS

| | | |
|---|---|---|
| 246,756 | Germany | May 10, 1912 |
| 866,480 | Germany | Feb. 9, 1953 |